United States Patent
Rossberg et al.

(10) Patent No.: US 10,908,044 B2
(45) Date of Patent: Feb. 2, 2021

(54) PRESSURE SENSOR HAVING A JOINT OF ACTIVE BRAZE

(71) Applicant: Endress + Hauser GmbH + Co. KG, Maulburg (DE)

(72) Inventors: Andreas Rossberg, Bad Sackingen (DE); Elke Schmidt, Bad Sackingen (DE); Markus Rettenmayr, Jena (DE); Peter Siegmund, Jena (DE); Uta Kuhn, Bannewitz/Bornchen (DE); Simon Pauly, Dresden (DE); Nils Ponath, Lorrach (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 81 days.

(21) Appl. No.: 15/573,959

(22) PCT Filed: May 10, 2016

(86) PCT No.: PCT/EP2016/060456
§ 371 (c)(1),
(2) Date: Nov. 14, 2017

(87) PCT Pub. No.: WO2016/198227
PCT Pub. Date: Dec. 15, 2016

(65) Prior Publication Data
US 2018/0292282 A1 Oct. 11, 2018

(30) Foreign Application Priority Data

Jun. 8, 2015 (DE) .................. 10 2015 108 950

(51) Int. Cl.
*G01L 19/14* (2006.01)
*G01L 9/00* (2006.01)

(52) U.S. Cl.
CPC .......... *G01L 19/145* (2013.01); *G01L 9/0075* (2013.01); *G01L 19/143* (2013.01)

(58) Field of Classification Search
CPC ........ G01L 9/145; G01L 9/0075; G01L 9/143
See application file for complete search history.

(56) References Cited

U.S. PATENT DOCUMENTS

| 4,944,187 A | * | 7/1990 | Frick | ...................... G01L 9/0042 338/4 |
| 5,334,344 A | * | 8/1994 | Hegner | ............... B22D 11/0611 228/121 |

(Continued)

FOREIGN PATENT DOCUMENTS

| CN | 101068647 A | 11/2007 |
| CN | 103502787 A | 1/2014 |

(Continued)

OTHER PUBLICATIONS

German Search Report, German PTO, Munich, dated Mar. 3, 2016.
(Continued)

*Primary Examiner* — Herbert K Roberts
*Assistant Examiner* — John M Royston
(74) *Attorney, Agent, or Firm* — Bacon & Thomas, PLLC

(57) ABSTRACT

A pressure sensor comprising two parts connected with one another via an active braze joint manufactured by active hard soldering, or brazing, with an active hard solder, or braze, especially a pressure contactable, pressure-dependently elastically deformable, measuring membrane, especially a ceramic measuring membrane, and a platform, especially a ceramic platform, which are connected by an active braze joint connecting an outer edge of the measuring membrane (which covers a pressure chamber with an outer edge of an end of the platform facing the measuring membrane, whose measuring characteristics are improved in that the active braze joint has a coefficient of thermal expansion (Continued)

dependent on the dimensions of the active braze joint and on the materials of the parts and matched to a coefficient of thermal expansion of at least one of the parts, especially the measuring membrane.

20 Claims, 1 Drawing Sheet

(56) References Cited

U.S. PATENT DOCUMENTS

| | | | |
|---|---|---|---|
| 5,351,938 | A | 10/1994 | Hegner et al. |
| 6,156,130 | A * | 12/2000 | Hegner ............... B23K 35/025 148/24 |

FOREIGN PATENT DOCUMENTS

| | | |
|---|---|---|
| DE | 10 2010 043 119 A1 | 5/2012 |
| DE | 10 2012 110 618 A1 | 5/2014 |
| DE | 10 2013 103 028 A1 | 9/2014 |
| DE | 10 2013 110 376 A1 | 3/2015 |
| DE | 10 2015 108 950 A1 | 12/2016 |
| EP | 0 490 807 A2 | 6/1992 |
| WO | WO-2014009070 A1 * | 1/2014 |
| WO | 2014/072193 A1 | 5/2014 |

OTHER PUBLICATIONS

International Search Report, EPO, The Netherlands, dated Aug. 22, 2016.
International Search Report, EPO, The Netherlands, dated Oct. 27, 2016.
Neumeier et al., "Capacitive-based dilatometer cell constructed of fused quartz for measuring the thermal expansion of solids", Review of Scientific Instruments, Institute of Physics, vol. 79, 2008, 8 pages.
Office Action dated Oct. 10, 2019 in corresponding Chinese application No. 201680031779.0.
Office Action dated Aug. 27, 2020 in corresponding Chinese application No. 201680031779.0.

* cited by examiner

PRESSURE SENSOR HAVING A JOINT OF ACTIVE BRAZE

TECHNICAL FIELD

The invention relates to a pressure sensor having two parts connected with one another via an active braze joint manufactured by active hard soldering, or brazing, with an active hard solder, or braze. The pressure sensor has especially a pressure contactable, pressure-dependently elastically deformable, measuring membrane, especially a ceramic measuring membrane, and a platform, especially a ceramic platform, which are connected by a joint of an active hard solder, or braze, connecting an outer edge of the measuring membrane (which covers a pressure chamber) with an outer edge of an end of the platform facing the measuring membrane. The invention relates as well to a method for manufacturing such a pressure sensor.

BACKGROUND DISCUSSION

Pressure sensors embodied as absolute pressure sensors, relative pressure sensors and pressure difference sensors are widely applied in almost all parts of industrial measurements technology.

Described in European patent, EP 490 807 A1 is a ceramic pressure sensor having
- a pressure-dependently elastically deformable, ceramic measuring membrane contactable with a pressure,
- a ceramic platform, and
- an active braze joint connecting an outer edge of the measuring membrane (which covers a pressure chamber) with an outer edge of an end of the platform facing the measuring membrane.

For reducing thermomechanical stresses within the pressure sensor, especially in the region of the measuring membrane, preferably applied for the active braze joints are active hard solders, or brazes, which have a coefficient of thermal expansion matched to the coefficient of thermal expansion of the ceramic of the platform and the measuring membrane. Suited for this for ceramics of aluminum oxide are the ternary active hard solders, or brazes, mentioned in EP 490 807 A1 composed of a Zr—Ni alloy and titanium.

Described in German patent, DE10,2012/110,618 A1 is a ceramic pressure sensor having a measuring membrane connected with a ceramic platform via an active braze joint and, for whose manufacture a solder, or braze, core of an active hard solder, or braze, was applied, which has on its sides facing the measuring membrane and the platform, in each case, a coating, which is composed of an active hard solder, or braze, which has a lower liquidus temperature than the active hard solder, or braze, of the solder, or braze, core. The coating is composed of zirconium, nickel, titanium and aluminum. The joining of measuring membrane and platform occurs here at a soldering temperature, at which the coatings wet the ceramic, while the solder, or braze, core remains essentially unchanged. In such case, applied for the solder, or braze, core is, for example, an active hard solder, or braze, ascertained by variation of the composition of an active hard solder, or braze, composed of zirconium, nickel and titanium and having a coefficient of thermal expansion, which is as similar as possible to that of the ceramic of the measuring membrane and platform.

Thermomechanical stresses in the case of active brazes can, however, also not be completely prevented by the above mentioned measures. Thus, stresses acting on the measuring membrane lead to a change of the pressure dependent deformability of the same and, in turn, influence the measuring characteristics of the pressure sensor. These stresses, regularly variable as a function of the ambient temperature, bring about an additional temperature dependence of the measurement results. Moreover, they can bring about a hysteresis of the measurement results dependent on the time variation of the ambient temperature and/or the pressure to be measured, which leads to a reduction of the achievable accuracy of measurement.

SUMMARY OF THE INVENTION

It is an object of the invention to provide a pressure sensor with improved measuring characteristics.

For this, the invention resides in a pressure sensor, comprising
- two parts connected with one another via an active braze joint manufactured by active hard soldering, or brazing, with an active hard solder, or braze, especially a pressure contactable, pressure-dependently elastically deformable, measuring membrane, especially a ceramic measuring membrane, and a platform, especially a ceramic platform, which are connected by an active braze joint connecting an outer edge of the measuring membrane (which covers a pressure chamber) with an outer edge of an end of the platform facing the measuring membrane,
- wherein the active braze joint has a coefficient of thermal expansion dependent on the dimensions of the active braze and on the materials of the parts and matched to a coefficient of thermal expansion of at least one of the parts, especially the measuring membrane.

A further development resides in a pressure sensor of the invention, in the case of which a difference between the coefficient of thermal expansion of the active braze joint and a coefficient of thermal expansion of the matched part, especially the measuring membrane, has an absolute value smaller than a difference between a coefficient of thermal expansion of the active hard solder, or braze, and the coefficient of thermal expansion of the part.

An embodiment resides in a pressure sensor of the invention, in the case of which
- at least one of the parts, especially the measuring membrane or the measuring membrane and the platform, is composed of an oxide ceramic, especially aluminum oxide, and
- the active hard solder, or braze, contains zirconium, nickel and titanium.

In a further development of the latter embodiment, the active hard solder, or braze, contains copper and/or aluminum.

A further development resides in a pressure sensor of the invention, in the case of which the active braze joint is produced from an active hard solder, or braze, which has the composition, $Zr_{63}Ni_{22}Ti_5$, $Zr_{60}Ni_8Ti_2Cu_{20}Al_{10}$, $Zr_{54.5}Ni_8Ti_{7.5}Cu_{20}Al_{10}$, $Zr_{47}Ni_{35}Ti_{18}$, $Zr_{58}Ni_{23}Ti_9Cu_{10}$, $Zr_{52.5}Ni_{14.6}Ti_5Cu_{17.9}Al_{10}$, $Zr_{43}Ni_{33}Ti_{24}$, or $Zr_{11}Ni_8Ti_{34}Cu_{47}$.

Additionally, the invention resides in an apparatus for measuring a coefficient of thermal expansion of an active braze joint of a pressure sensor of the invention, comprising
- two measuring bodies, especially two measuring bodies composed of the material of the matched part of the pressure sensor,
  which are connected with one another via an active braze joint, which is produced from the same active hard solder, or braze, from which also the active braze joint having the expansion coefficient to be measured is produced, and has the same dimensions as such active braze joint, which have electrodes on mutually facing ends, wherein the electrodes form a capacitor having a capacitance dependent on their electrode separation dependent on a temperature dependent height of the active braze, a heating apparatus, and, connected to the electrodes, a measurement circuit, which measures capacitance of the capacitor at at least two different temperatures of the active braze joint, and based on its dependence on the height of the active braze joint, especially based on its dependence on the height of the active braze joint and a temperature dependence of the measured capacitances, especially a temperature dependence of the measured capacitances dependent on a temperature dependence of electrode areas of the electrodes, determines the coefficient of thermal expansion of the active braze joint.

A further development of the apparatus resides in an apparatus, in the case of which the electrodes are of equal construction and are circular disk shaped, and the temperature dependence of the electrode areas of the electrodes is taken into consideration based on a temperature dependent diameter of the electrodes, which rises with temperature approximately linearly with an electrode expansion coefficient, wherein the electrode expansion coefficient is especially an electrode expansion coefficient determined based on capacitance measurements executed with two apparatuses of the invention differing exclusively in the diameters of their electrodes.

Another further development of the apparatus resides in an apparatus, in the case of which the electrodes are disk shaped and have in comparison to the height of the active braze joint a small disk thickness, especially a disk thickness, which is smaller in the order of magnitude of two powers of ten than the height of the active braze joint.

Additionally, the invention resides in a method for manufacturing a pressure sensor of the invention, wherein the active hard solder, or braze, for manufacturing the active braze joint of the pressure sensor is determined by a method, in the case of which at least one measuring is performed, in the case of which a thermal expansion coefficient of an active braze joint executed with an active hard solder, or braze, is determined, wherein the dimensions of the active braze joint equal the dimensions of the active braze joint of the pressure sensor and wherein the two bodies, especially two bodies of the material of the matched part of the pressure sensor, are connected with one another by the active braze joint.

A further development of this method provides that one or more measurings are executed in a method, in the case of which two measuring bodies, especially two measuring bodies composed of the material of the matched part of the pressure sensor, are connected with one another via an active braze joint, which is produced from the active hard solder, or braze, from which the active braze joint having the expansion coefficient to be measured is produced, and which has the same dimensions as the latter, wherein the measuring bodies have electrodes on mutually facing ends and the electrodes form a capacitor having a capacitance dependent on their electrode separation dependent on a temperature dependent height of the active braze joint, the capacitance of the capacitor is measured at at least two different temperatures of the active braze joint and based on its dependence on the height of the active braze joint, especially based on its dependence on the height of the active braze joint and a temperature dependence of the measured capacitances, especially a temperature dependence of the measured capacitances dependent on a temperature dependence of the electrode areas of the electrodes, the thermal expansion coefficient of the active braze joint is determined.

A further development of the latter method includes a method, in the case of which the electrodes are of equal construction and circular disk shaped, and the temperature dependence of the electrode areas of the electrodes is taken into consideration based on a temperature dependent diameter of the electrodes, which rises approximately linearly with temperature in accordance with an electrode expansion coefficient, wherein the electrode expansion coefficient is especially an electrode expansion coefficient determined based on capacitance measurements executed with two apparatuses of the invention differing from one another exclusively in the diameters of their electrodes.

A further development of the method of the invention resides in a method, in the case of which the active hard solder, or braze, from which the active braze joint of the pressure sensor is produced, is ascertained by ascertaining, for active brazing of the parts of the pressure sensor, suitable test hard solders, or brazes, of different compositions, especially test hard solders, or brazes, containing components of a starting hard solder, or braze, suitable for active brazing of the parts, measuring coefficients of thermal expansion of active braze joints produced with the test hard solders, or brazes, and, based on the measured coefficients of expansion, ascertaining that test hard solder, or braze, as active hard solder, or braze, in the case of which a difference between the coefficient of thermal expansion of the active braze joint manufactured therewith and the coefficient of thermal expansion of at least one of the parts has the smallest absolute value.

In a first embodiment of the latter further development at least one of the test hard solders, or brazes, is composed exclusively of the components of the starting hard solder, or braze, and/or at least one of the test hard solders, or brazes, includes, supplementally to the components of the starting hard solder, or braze, at least one other component.

In a second embodiment of the latter further development at least one of the parts is composed of oxide ceramic, especially aluminum oxide, the test hard solders, or brazes, contain the components, zirconium, nickel and titanium, and at least one test hard solder, or braze, is composed exclusively of zirconium, nickel and titanium and/or at least one test hard solder, or braze, includes zirconium, nickel and titanium and at least one other component, especially copper or aluminum.

A further development of the method of the invention resides in a method, in the case of which a thermal expansion coefficient of an active braze joint executed with an active hard solder, or braze, especially a starting hard solder, or braze, or a test hard solder, or braze, is determined, which has the composition, $Zr_{63}Ni_{22}Ti_{15}$, $Zr_{60}Ni_8Ti_2Cu_{20}Al_{10}$, $Zr_{54.5}Ni_8Ti_{7.5}Cu_{20}Al_{10}$, $Zr_{47}Ni_{35}Ti_{18}$, $Zr_{58}Ni_{23}Ti_9Cu_{10}$, $Zr_{52.5}Ni_{14.6}Ti_5Cu_{17.9}Al_{10}$, $Zr_{43}Ni_{33}Ti_{24}$, or $Zr_{11}Ni_8Ti_{34}Cu_{47}$.

BRIEF DESCRIPTION OF THE DRAWINGS

The invention and its advantages will now be explained in greater detail based on the figures of the drawing, in which an example of an embodiment is shown. Equal elements are provided in the figures with equal reference characters. The figures of the drawing show as follows.

DETAILED DISCUSSION IN CONJUNCTION WITH THE DRAWINGS

Figure 1:
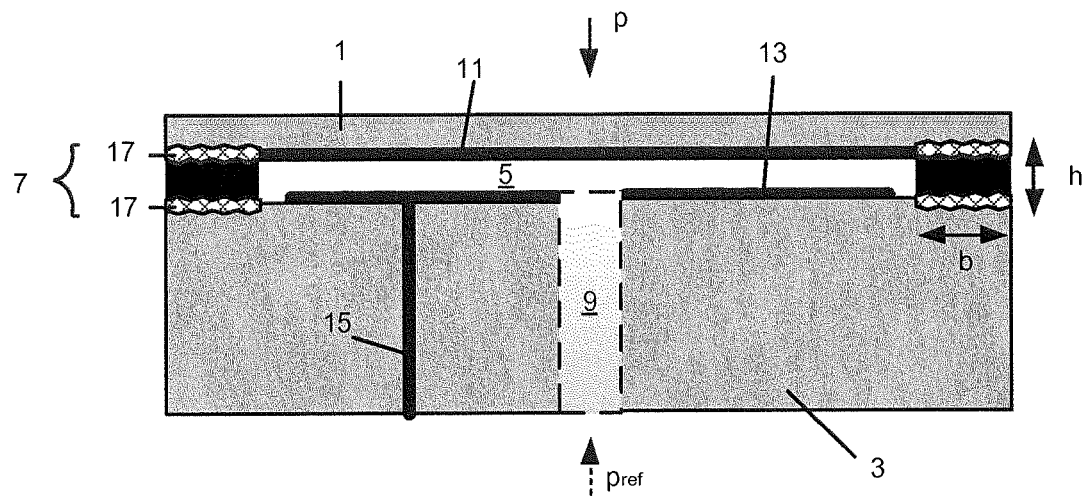
FIG. 1 is a ceramic pressure sensor.

FIG. 1 shows, by way of example, a section of an embodiment of a pressure sensor. This includes, loadable with a pressure p and pressure-dependently elastically deformable, a measuring membrane 1, which is arranged on a platform 3. Measuring membrane 1 and preferably also the platform 3 are preferably composed of ceramic, e.g. aluminum oxide ($Al_2O_3$), and are connected pressure-tightly with one another to enclose a pressure chamber 5. For this, an outer edge of the measuring membrane 1 facing the platform 3 is connected by means of an active braze joint 7 with an outer edge of an end of the platform 3 facing the measuring membrane 1. The pressure sensor is thus formed of two parts connected with one another via a joint 7 of an active braze.

The shown pressure sensor can be embodied in the form of an absolute pressure sensor. In such case, the pressure chamber 5 enclosed under the measuring membrane 1 is evacuated. Alternatively, it can be embodied in the form of a relative pressure sensor, in which case the pressure chamber 5 is fed a reference pressure Pref, e.g. atmospheric pressure, via a bore 9 (drawn with dashed lines) extending in FIG. 1 through the platform 3. Thus, in the case of a relative pressure sensor, the pressure p acting on the measuring membrane 1 is registered with reference to the reference pressure $p_{ref}$. The invention is naturally applicable completely analogously also in connection with pressure sensors formed as pressure difference sensors, which have at least one measuring membrane connected with a platform via a joint of an active braze.

The pressure sensor includes an electromechanical transducer, which serves metrologically to register a pressure-dependent deformation of the measuring membrane 1. The transducer comprises e.g. at least one capacitor having a capacitance changing as a function of the pressure related deflection of the measuring membrane 1. The capacitor includes an electrode 11 applied on the measuring membrane 1 facing the platform 3 and a counterelectrode 13 applied on an end of the platform 3 facing the measuring membrane 1. The pressure-dependent capacitance of the capacitor, or its changes, are registered via a measuring electronics (not shown) connected to the electrode 11 and the counterelectrode 13 and converted into a pressure dependent measurement signal, which is then available for display, additional processing and/or evaluation.

Pressure sensors of the inventions are produced by prefabricating measuring membrane 1 and platform 3 and applying the electrode 11 and the counterelectrode 13 on the corresponding faces of measuring membrane 1 and platform 3, e.g. by sputter deposition. In such case, an electrical connection of the counterelectrode 13 can be provided at the same time by inserting a contact pin 15, e.g. a tantalum pin, in a bore extending through the platform 3, in order to establish an electrically conductive connection to the counterelectrode 13. Then, measuring membrane 1 and platform 3 are connected pressure-tightly with one another by active hard soldering, or brazing, in order to enclose the pressure chamber 5. For this, a solder layer of an active hard solder, or braze, is arranged between the mutually facing outer edges of platform 3 and measuring membrane 1 to be connected by the joint 7 of active braze. The hard solder/braze layer can be implemented e.g. in the manner described in EP 490 807 A1 deposited as hard solder/braze paste or put in place in the form a prefabricated hard solder/braze preform, e.g. a ring of hard solder/braze. In this way, joints 7 of active braze can be manufactured with height h of greater than or equal to 30 μm. A smaller minimum height of the joint 7 of active braze connecting measuring membrane 1 and platform 3 and, associated therewith, a lesser electrode separation more advantageous for achieving a higher accuracy of measurement can be achieved according to a method described in DE10,2010/043119 A1, where the solder layer is applied on one of the joining surfaces or partially on both of the joining surfaces by means of gas phase deposition. In this way, joints 7 of active braze with a height h in the order of magnitude of 10 μm can be produced.

After the introduction, or application, of the solder layer, the total arrangement formed by the platform 3, the hard solder/braze layer and the measuring membrane 1 is heated under vacuum to a hard soldering/brazing temperature lying above the melting temperature of the active hard solder, or braze, and held there for a period of time, especially a time of 5 min to 15 min. Alternatively, an active hard soldering, or brazing, method described in DE 10,2011/005665 A1 can be used, in the case of which the hard solder/braze layer is completely melted under vacuum using laser radiation.

At the hard soldering/brazing temperature, the active component of the active hard solder, or braze, reacts with the ceramic. In such case, a mechanically high strength, chemical connection forms between the ceramic and the active hard solder, or braze, from the reduction of the ceramic. Due to this chemical reaction, there forms on the sides of the joint 7 of active braze facing the measuring membrane 1 and the platform 3, in each case, a connecting layer 17, which differs both as regards its composition as well as also as regards its properties from the active hard solder, or braze, utilized for the joint. The connecting layers 17 have a coating thickness in the order of magnitude of a few micrometers, especially in the order of magnitude of 2 μm to 3 μm. Especially in the case of active brazes 7 with comparatively smaller height h, especially a height h in the order of magnitude of 10 μm to 30 μm, the thickness of the connecting layers represents, thus, a not to be neglected part of the height h of the joint 7.

Due to the changes resulting from the chemical reactions, the joint 7 has, dependent on its dimensions and on the materials of the parts connected therewith, a coefficient of thermal expansion, which differs from the coefficient of thermal expansion of the active hard solder, or braze, utilized for its manufacture. In such case, the difference between these two coefficients of thermal expansion is greater, the greater the fraction of the connecting layers 17 in the joint 7.

Thus, for example, an active hard solder, or braze, containing zirconium, nickel and titanium with a composition in atom-% of $Zr_{63}Ni_{22}Ti_{15}$ has in a temperature range from 30°

C. to 125° C. a coefficient of thermal expansion of 11 ppm/K, while an annular joint 7 manufactured from this active hard solder, or braze, connecting two parts of aluminum oxide ($Al_2O_3$) and having an inner diameter of 25 mm and a rectangular cross section with a height h of 30 µm and a width b of 3.6 mm has in this temperature range a coefficient of thermal expansion of 8.7 ppm/K. Ceramics of aluminum oxide ($Al_2O_3$) have a coefficient of thermal expansion in the order of magnitude of 7 ppm/K to 8 ppm/K. The active braze joint 7 executed with $Zr_{63}Ni_{22}Ti_{15}$ has here a coefficient of expansion matched quite well to these ceramics, while the coefficient of expansion of the utilized active hard solder, or braze, $Zr_{63}Ni_{22}Ti_{15}$ deviates significantly from that of the ceramic.

While in the state of the art for manufacturing the active braze joint 7 active hard solders, or brazes, are applied, which have a coefficient of expansion matched to the coefficient of thermal expansion of the parts, in the case of the pressure sensor of the inventions, instead of that, an active hard solder, or braze, is applied, in the case of which the active braze joint 7 produced with the active hard solder, or braze, has a coefficient of thermal expansion matched to the coefficient of thermal expansion of at least one of the parts. According to the invention, the active braze joint 7 is thus an active braze joint 7 manufactured by means of an active hard solder, or braze, which, in the soldered, or brazed, state yields a coefficient of thermal expansion, which is as similar as possible to that of at least one of the parts connected via the active braze joint 7.

Accordingly, the absolute value of the difference between the coefficient of thermal expansion of the active braze joint 7 and the coefficient of thermal expansion of the matched part, is in the case of a pressure sensor of the invention smaller than the absolute value of the difference between the coefficient of thermal expansion of the active hard solder, or braze, and the coefficient of thermal expansion of this part.

If measuring membrane 1 and platform 3 have different coefficients of thermal expansion, then the matching is mainly to the coefficient of expansion of the measuring membrane 1, since thermomechanical stresses reacting on the measuring membrane 1 degrade the measuring characteristics of the pressure sensor in stronger measure than stresses reacting on the platform 3.

The thermal expansion coefficient of the active hard solder, or braze, can be determined, for example, by a dilatometer measurement, wherein a body of the active hard solder, or braze, is clamped in a dilatometer, and its longitudinal extension measured as a function of temperature.

Analogously, also the temperature dependent height change of the height h of the active braze joint 7 can be taken into consideration as a measure for the thermal expansion coefficient of the active braze joint 7. This can basically be determined based on the temperature dependence of the height change of the combination of the two parts connected via the active braze joint 7, the height of the active braze joint 7, the heights of the two parts and the separately determined, e.g. by a dilatometer measurement, coefficients of thermal expansion of the parts. In the case of pressure sensors, there is, in such case, however, the problem that possibly occurring thermomechanical stress deformations, especially of the comparatively thin measuring membrane 1, can lead to measurement errors in the determining of the coefficient of expansion of the active braze joint 7.

Figure 2:
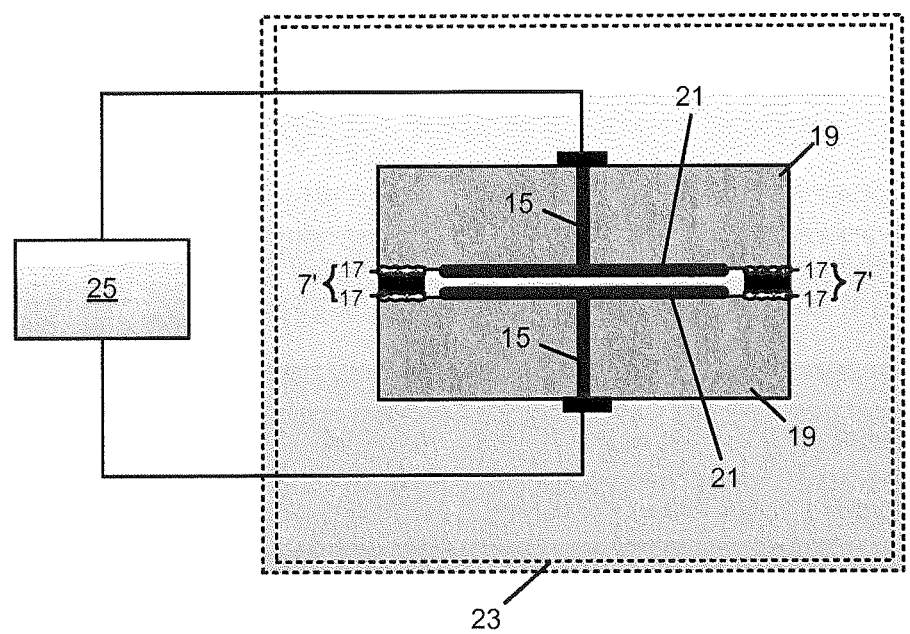
FIG. 2 is an arrangement for measuring the coefficient of thermal expansion of an active braze joint.

For measuring the coefficient of thermal expansion of the active braze joint 7, consequently, preferably an apparatus shown in FIG. 2 is applied. This has, connected with one another via an active braze joint 7', two measuring bodies 19, which are composed of the material of the part of the pressure sensor, here thus preferably the ceramic of the measuring membrane 1, for which the matching should occur. Applied for making the active braze joint 7' connecting the measuring bodies 19 is the same active hard solder, or braze, which also is applied for manufacturing the active braze joint 7, whose expansion coefficient is to be measured. Moreover, the active braze joint 7' connecting the measuring bodies 19 has the same dimensions as the active braze joint 7, whose expansion coefficient is to be measured. The active braze joint 7' is embodied exactly as that of the pressure sensor, as an active braze joint 7' in the form of a closed ring with rectangular cross section of height h and width b. Each of the measuring bodies 19 has on its end facing the other measuring body 19 an electrode 21. The two electrodes 21 are arranged planparallel to one another and form a capacitor, whose capacitance is inversely proportional to the separation between the electrodes 21. The electrode separation depends on the height h of the active braze joint 7' and changes accordingly as a function of temperature T in accordance with the coefficient of thermal expansion of the active braze joint 7'. The measuring of the coefficient of expansion is accomplished by heating the active braze joint 7' by means of a heating apparatus 23, e.g. a furnace, to at least two different temperatures and measuring the capacitance of the capacitor as a function of temperature of the active braze joint 7'. For this, the electrodes 21 are connected via contact pins 15 extending through the measuring body 19 to a measurement circuit 25, which determines the capacitance of the capacitor at at least two different temperatures, and based on the capacitances measured as a function of temperature and their dependence on the likewise temperature dependent height h of the active braze joint 7', determine the coefficient of thermal expansion of the active braze joint 7'.

The determining of the coefficient of thermal expansion of the active braze joint 7' based on the capacitances is burdened by a measurement error dependent on the temperatures, at which the capacitances are measured. This measurement error is especially dependent on a temperature dependence of the measured capacitances.

A cause for this is the thermal expansion of the measuring body 19 and the electrodes 21 connected therewith. This leads to the fact that the effective electrode areas of the electrodes 21 and therewith also the capacitance of the capacitor change as a function of temperature.

This measurement error is preferably reduced by taking into consideration a temperature dependence of the size of the electrode areas of the electrodes 21 in determining the coefficients of expansion.

In such case, the capacitance C of the capacitor measured at a temperature T is:

$$C(T)=\varepsilon A(T)/h(T),$$

wherein ε is the dielectric constant of the medium filling the capacitor, A(T) the temperature dependent electrode area of the electrodes 21 and h(T) the temperature dependent height of the active braze joint 7'.

If one applies two equally constructed, circular disk shaped electrodes 21, then the temperature dependent electrode area A(T) is:

$$A(T)=\pi/4 d(T)^2$$

wherein d(T) is the temperature dependent diameter of the electrodes 21, which is approximately: $D(T)=[1+\alpha_E(T-T_0)]d(T_0)$, wherein $\alpha_E$ is an electrode expansion coefficient.

The temperature dependent height h(T) of the active braze joint 7' is:

$$h(T)=[1-\alpha_{AHL}(T-T_0)]h(T_0)$$

wherein $\alpha_{AHL}$ is the coefficient of thermal expansion of the active braze joint 7' and $h(T_0)$ the height h of the active braze joint 7' at the temperature $T_0$.

From this there results then, based on the ratios $C(T)/C(T_0)$ of the capacitances $C(T)$, $C(T_0)$ measured at the temperature T and the temperature $T_0$, taking into consideration the temperature dependent electrode area $A(T)$, the thermal expansion coefficient $\alpha_{AHL}$ of the active braze joint 7' as follows:

$$\alpha_{AHL} = \frac{\left(1+\alpha_E(T-T_0)\right)^2 \frac{C(T)}{C(T_0)} - 1}{T-T_0}$$

As evident from this equation, the electrode expansion coefficient $\alpha_E$ can be determined e.g. by making a reference measurement with a second apparatus, which differs from the here described apparatus exclusively in the fact that its electrodes 21 have another diameter d. Since the coefficients of thermal expansion $\alpha_{AHL}$ of the identical active braze joints 7' of the two apparatuses are identical, by setting equal the coefficients of thermal expansion $\alpha_{AHL}$ of the active braze joint 7' determined with the two apparatuses, in each case, as a function of capacitances $C(T)$, $C(T_0)$ measured at the temperatures T and $T_0$ and the electrode expansion coefficient CE, the electrode expansion coefficient $\alpha_E$ of the electrodes 21 can be determined. This electrode expansion coefficient $\alpha_E$ can subsequently be used for any number of other measurements of coefficients of expansion of active braze joints 7' made with apparatuses with form- and material equal electrodes 21 and form- and material equal measuring bodies 19.

The electrodes 21 are disk shaped and have preferably in comparison with the height of the active braze joint 7' a very small disk thickness. Preferably, the electrodes 21 have a disk thickness, which is in the order of magnitude of two powers of ten smaller than the height of the active braze joint 7'. In connection with active braze joints 7' with a height of greater than or equal to 30 μm, e.g. electrodes 21 can be applied with a disk thickness, which is less than or equal to one tenth or a few tenths of a micrometer. Such thin electrodes 21 offer the advantage that the influence of temperature-dependent changes of the disk thickness on the accuracy of measurement of the measuring of the thermal coefficients of expansion of the active braze joint 7' is negligibly small.

The measuring bodies 19 are preferably comparatively substantial bodies. In this way, it is assured that the measuring bodies 19 are form stable over a broad temperature range, and especially deflections of the measuring body 19 caused by thermomechanical stresses are avoided. For this, e.g. disk-shaped measuring bodies 19 can be applied, which have a thickness, i.e. a structural height, which is significantly greater than the thickness of the measuring membrane 1.

The manufacture of pressure sensors of the invention occurs preferably by ascertaining first, based on the dimensions of the active braze joint 7 of the pressure sensor, an active hard solder, or braze, which, in the soldered, or brazed, state, has a coefficient of thermal expansion matched to the coefficient of thermal expansion of the parts, especially the measuring membrane 1. For this, a method is applied, in the case of which at least one measuring is performed, in the case of which a thermal expansion coefficient of an active braze joint 7' executed with an active hard solder, or braze, is determined, wherein the dimensions of the active braze joint 7' equal the dimensions of the active braze joint 7 of the pressure sensor and two bodies, especially two bodies of the material of the matched part of the pressure sensor, are connected with one another by the active braze joint 7'. The one or more measurements are preferably executed in the above described manner.

Active hard solders, or brazes, which in the soldered, or brazed, state have a coefficient of thermal expansion matched to the coefficient of thermal expansion of the ceramic, can be ascertained, for example, by taking into consideration as starting point the components of a previously known, starting hard solder, or braze, suitable for active brazing of the parts of the pressure sensor. Starting solders, or brazes, suitable for active brazing of ceramics, especially aluminum oxide, are e.g. the above mentioned solders containing the components zirconium, nickel and titanium.

Derived from these are test hard solders, or brazes, which contain the components of the starting hard solder, or braze, in different percentages. Then, for a series of test hard solders, or brazes, in each case, the thermal expansion coefficient of an active braze joint 7' manufactured therewith is measured and that composition ascertained, in the case of which the thermal expansion coefficient of the active braze joint 7' comes closest to that of the parts to be soldered, or brazed.

In such case, test hard solders, or brazes, can be taken into consideration, which contain exclusively the components of the starting hard solder, or braze, and have these components in percentages which very from test hard solder, or braze, to test hard solder, or braze.

Alternatively or supplementally, test hard solders, or brazes, can be derived, which contain the components of the starting hard solder, or braze, and at least one other component K serving for targeted increasing or lowering of the coefficient of expansion. In connection with starting hard solders, or brazes, containing zirconium, nickel and titanium, suited for this as other components K are especially copper and/or aluminum.

Thus, for example, a four material system of the composition (100−X) % $[Zr_aNi_bTi_c]$+X % K, wherein a, b and c give the composition of the starting hard solder, or braze, in atom-%, and K refers to the other component, which is composed here of either copper or of aluminum, has a coefficient of thermal expansion sinking with rising percentage X of the additional component K. Analogously, also a five material system of zirconium, and a nickel, titanium, copper and aluminum can be printed out as an alloy with a first part of (100−Y) % $[Zr_aNi_bTi_c]$ having the composition of the starting hard solder, or braze, and a second part of Y % $[Cu_dAl_e]$ containing the components copper and aluminum, wherein a, b and c give the composition of the starting hard solder, or braze, in atom-%, and d and e the composition of the second part in atom-%. Also this five material system has a coefficient of thermal expansion dependent on the variable Y and the composition d, e of the second fraction, wherein the starting value depends on the composition of the starting hard solder, or braze, and the thermal expansion coefficient changes as a function of the variable Y and the composition d, e of the second part.

For illustrating the range of coefficients of thermal expansion achievable in the above described manner, the following table gives, for a selection of test hard solders, or brazes, containing zirconium, nickel and titanium in different percentages as well as test hard solders, or brazes, containing zirconium, nickel and titanium as well as copper and/or aluminum in different percentages, the thermal expansion coefficient $\alpha_{AHL}$ measured in the above described manner in a temperature range from 30° C. to 125° C. for an annular active braze joint 7' of inner diameter 25 mm and rectangular cross section with height h=30 μm and width b=3.6 mm manufactured with these test hard solders, or brazes, and connecting two measuring bodies 19 of aluminum oxide ($Al_2O_3$).

| Composition | $\alpha_{AHL}$ |
|---|---|
| $Zr_{63}Ni_{22}Ti_{15}$ | 8.7 ppm/K |
| $Zr_{60}Ni_8Ti_2Cu_{20}Al_{10}$ | 11.4 ppm/K |
| $Zr_{54.5}Ni_8Ti_{7.5}Cu_{20}Al_{10}$ | 8.8 ppm/K |
| $Zr_{47}Ni_{35}Ti_{18}$ | 11.6 ppm/K |
| $Zr_{58}Ni_{23}Ti_9Cu_{10}$ | 14.4 ppm/K |
| $Zr_{52.5}Ni_{14.6}Ti_5Cu_{17.9}Al_{10}$ | 12.2 ppm/K |
| $Zr_{43}Ni_{33}Ti_{24}$ | 9.3 ppm/K |
| $Zr_{11}Ni_8Ti_{34}Cu_{47}$ | 19.9 ppm/K |

Also, while the invention has been described here using the example in a pressure sensor of an active braze joint 7 connecting a measuring membrane 1 of aluminum oxide with a platform 3 of aluminum oxide, it can naturally also be applied completely analogously to other parts of a pressure sensor of aluminum oxide or other materials connected with one another via an active braze joint. Thus, also in such case, active hard solders, or brazes, are provided, which in the soldered, or brazed, state have a coefficient of thermal expansion matched to the thermal expansion coefficient of the parts. In such case, the above explanations hold correspondingly, wherein the two measuring bodies 19 of the apparatus for measuring the coefficients of expansion, depending on form of the active braze joint, whose expansion coefficient is to be measured, can even be connected via two or more active braze joints having the dimension of the active braze joint, whose expansion coefficient is to be measured, and arranged between the measuring bodies 19 in such a manner that they effect a planparallel orientation of the measuring bodies 19, and the electrodes 21 arranged thereon.

Since the test hard solders, or brazes, for aluminum oxide set-forth above in the table span an extremely large range of coefficients of thermal expansion from 8.7 ppm/K to 19.9 ppm/K, they are especially suited as starting points for ascertaining with the method of the invention for a plurality of materials having different coefficients of thermal expansion, in each case, an active hard solder, or braze, in the case of which therewith executed active braze joints have a coefficient of thermal expansion optimally matched to the coefficient of thermal expansion of the parts to be soldered, or brazed.

In such case, the above mentioned test hard solders, or brazes, can, in the case of appropriate coefficients of expansion of the active braze joints 7' manufactured therewith connecting two measuring bodies 19 of the relevant material of the parts, be directly applied as active hard solder, or braze, for the active hard soldering, or brazing, of the respective material, or be taken into consideration as starting hard solder, or braze, based on which, then, using the above described method, an active hard solder, or braze, is ascertained, in the case of which active braze joints manufactured therewith have a coefficient of thermal expansion matched to the coefficient of thermal expansion of the material of the parts.

In such case, each of the mentioned test hard solders, or brazes, is preferably applied as active hard solder, or braze, or as starting hard solder, or braze, for ascertaining an active hard solder, or braze, for active brazing of parts, whose thermal expansion coefficient lies in the region of the coefficient of thermal expansion listed in the table for the particular test hard solder, or braze, for the active braze joint executed therewith.

As an example for this, preferably $Zr_{60}Ni_8Ti_2Cu_{20}Al_{10}$ or $Zr_{47}Ni_{35}Ti_{18}$ is used as active hard solder, or braze, or as starting hard solder, or braze, for a ceramic body of zirconium oxide having a coefficient of thermal expansion in the order of magnitude of 11.0 ppm/K, while for a ceramic body of aluminum oxide with a coefficient of thermal expansion in the order of magnitude of 7 ppm/K to 8 ppm/K, preferably $Zr_{63}Ni_{22}Ti_5$ or $Zr_{54.5}Ni_8Ti_{7.5}Cu_{20}Al_{10}$ is used. For parts made of dispersion ceramics containing zirconium- and aluminum oxide, which have a coefficient of thermal expansion lying between the coefficients of expansion of zirconium oxide and aluminum oxide, depending on the size of the coefficient of expansion, $Zr_{60}Ni_8Ti_2Cu_{20}Al_{10}$, $Zr_{54.5}Ni_8Ti_{7.5}Cu_{20}Al_{10}$, $Zr_{47}Ni_{35}Ti_{18}$, $Zr_{43}Ni_{33}Ti_{24}$ or $Zr_{63}Ni_{22}Ti_{15}$ is used as active hard solder, or braze, or as starting hard solder, or braze. For parts made of materials with a coefficient of thermal expansion in the range from 6 ppm/K to 8 ppm/K, such as, for example, titanium oxide ($TiO_2$) or soapstone, suited as active hard solder, or braze, or as starting hard solder, or braze, depending on size of the coefficient of expansion, are especially $Zr_{63}Ni_{22}Ti_{15}$ or $Zr_{54.5}Ni_8Ti_{7.5}Cu_{20}Al_{10}$.

LIST OF REFERENCE CHARACTERS 1 measuring membrane
3 platform
5 pressure chamber
7 joint of active braze
9 bore
11 electrode
13 counterelectrode
15 contact pin
17 connecting layer
19 measuring body
21 electrode
23 heating system
25 measurement circuit

The invention claimed is:
1. A pressure sensor, comprising:
two parts connected with one another via an active braze joint manufactured by active hard soldering, or brazing, with an active hard solder, or braze, wherein one of the two parts is a pressure contactable, pressure-dependently elastically deformable, measuring membrane, and the other one of the two parts is a base body, wherein the membrane and the base body are connected by the active braze joint connecting an outer edge of said measuring membrane with an outer edge of an end of said base body facing said measuring membrane, thereby creating a pressure chamber, wherein:
said active braze joint has a coefficient of thermal expansion dependent on the dimensions of said active braze joint and on the materials of said two parts and said coefficient of thermal expansion of said active braze joint is matched to a coefficient of thermal expansion of said measuring membrane;

wherein the matching is performed based on the dimensions of the active braze joing such that a difference between the coefficient of thermal expansion of said active braze joint and a coefficient of thermal expansion of said measuring membrane, has an absolute value smaller than a difference between a coefficient of thermal expansion of said active hard solder, or braze, and the coefficient of thermal expansion of said measuring membrane.

2. The pressure sensor claimed in claim 1, wherein:
at least one of said measuring membrane and said base body, is composed of an oxide ceramic, and said active hard solder, or braze, contains zirconium, nickel and titanium.

3. The pressure sensor as claimed in claim 2, wherein:
said active hard solder, or braze, contains copper and/or aluminum.

4. The pressure sensor as claimed in claim 1, wherein:
said active braze joint is produced from an active hard solder, or braze, which has the composition, $Zr_{63}Ni_{22}Ti_{15}$, $Zr_{60}Ni_8Ti_2Cu_{20}Al_{10}$, $Zr_{54.5}Ni_8Ti_{7.5}Cu_{20}Al_{10}$, $Zr_{47}Ni_{35}Ti_{18}$, $Zr_{58}Ni_{23}Ti_9Cu_{10}$, $Zr_{52.5}Ni_{14.6}Ti_5Cu_{17.9}Al_{10}$, $Zr_{43}Ni_{33}Ti_{24}$, or $Zr_{11}Ni_8Ti_{34}Cu_{47}$.

5. An apparatus configured to measure a coefficient of thermal expansion of the active braze joint of a pressure sensor as claimed in claim 1, comprising:
two measuring bodies, said two measuring bodies being connected with one another via a second active braze joint, which is produced from the same active hard solder, or braze, from which also the active braze joint having the expansion coefficient to be measured is produced, and has the same dimensions as such active braze joint, and having electrodes on mutually facing ends, said electrodes form a capacitor having a capacitance dependent on their electrode separation dependent on a temperature dependent height of the second active braze joint;
a heating apparatus; and
a measuring circuit connected to the electrodes, which measures capacitance of said capacitor at at least two different temperatures of the second active braze joint, and based on its dependence on the height of the second active braze joint, determines the coefficient of thermal expansion of the second active braze joint.

6. The apparatus as claimed in claim 5, wherein:
the electrodes are of equal construction and circular disk shaped;
the temperature dependence of the electrode areas of the electrodes is taken into consideration based on a temperature dependent diameter of said electrodes, which rises with temperature approximately linearly with an electrode expansion coefficient.

7. The apparatus as claimed in claim 5, wherein:
the electrodes are disk shaped and have in comparison to the height of the second active braze joint a disk thickness, which is smaller in the order of magnitude of two powers of ten than the height of the second active braze joint.

8. The pressure sensor as claimed in claim 1, wherein the measuring membrane is a ceramic measuring membrane and/or the base body is a ceramic base body.

9. The pressure sensor as claimed in claim 2, wherein at least the measuring membrane or the measuring membrane and the base body platform, is/are composed of aluminum oxide.

10. A method for manufacturing a pressure sensor, the pressure sensor comprising: two parts connected with one another via an active braze joint manufactured by active hard soldering, or brazing, with an active hard solder, or braze, wherein one of the two parts is a pressure contactable, pressure-dependently elastically deformable, measuring membrane, and the other one of the two parts is a base body, wherein the membrane and the base body are connected by an active braze joint connecting an outer edge of said measuring membrane with an outer edge of an end of said base body facing said measuring membrane, thereby creating a pressure chamber, wherein the method comprises the steps of:
determining the active hard solder, or braze, for manufacturing the active braze joint of the pressure sensor, based on the dimensions of the active braze joint, such, that said active braze joint has a coefficient of thermal expansion dependent on the dimensions of said active braze joint and on the materials of said two parts and said coefficient of thermal expansion of said active braze joint is matched to a coefficient of thermal expansion of said measuring membrane wherein the matching is performed such that a difference between the coefficient of thermal expansion of said active braze joint and a coefficient of thermal expansion of said measuring membrane has an absolute value smaller than a difference between a coefficient of thermal expansion of said active hard solder, or braze, and the coefficient of thermal expansion of said measuring membrane,
and wherein the determination of the active hard solder, or braze, comprises steps of:
performing at least one measurement; wherein
a thermal expansion coefficient of a second active braze joint made with an active hard solder, or braze, is determined, wherein:
the dimensions of the second active braze joint equal the dimensions of the active braze joint of the pressure sensor; and
wherein two measuring bodies are connected with one another by the second active braze joint, and
wherein a thickness of each of the two measuring bodies is larger than a thickness of the membrane of the pressure sensor.

11. The method as claimed in claim 10, wherein:
the measuring bodies have electrodes on mutually facing ends and the electrodes form a capacitor having a capacitance dependent on their electrode separation dependent on a temperature dependent height of the second active braze joint;
and wherein said at least one measurement comprises the step of:
measuring the capacitance of the capacitor at at least two different temperatures of the second active braze joint and, based on a dependence of the capacitance on the height of the second active braze joint the thermal expansion coefficient of the second active braze joint is determined.

12. The method as claimed in claim 11, wherein:
the electrodes are of equal construction and circular disk shaped; and
the temperature dependence of the electrode areas of the electrodes is taken into consideration based on a temperature dependent diameter of the electrodes, which rises approximately linearly with temperature in accordance with an electrode expansion coefficient.

13. The method as claimed in claim 10, wherein:
the active hard solder, or braze, from which the active braze joint of the pressure sensor is produced, is ascertained by:
ascertaining, for active brazing of the two parts of the pressure sensor, suitable test hard solders, or brazes, of different compositions, containing components of a starting hard solder, or braze, wherein the test hard solders are configured for active brazing of the two parts;
measuring coefficients of thermal expansion of the second active braze joints produced with the test hard solders, or brazes; and
based on the measured coefficients of expansion, ascertaining the one test hard solder, or braze, as active hard solder, or braze, for which a difference between the coefficient of thermal expansion of the second active braze joint manufactured therewith and the coefficient of thermal expansion of the measuring membrane has the smallest absolute value.

14. The method as claimed in claim 13, wherein:
at least one of the test hard solders, or brazes, is composed exclusively of the components of the starting hard solder, or braze; and/or
at least one of the test hard solders, or brazes, includes, supplementally to the components of the starting hard solder, or braze, at least one other component.

15. The method as claimed in claim 13, wherein:
at least one of the two parts is composed of oxide ceramic;
the test hard solders, or brazes, contain the components, zirconium, nickel and titanium; and
at least one test hard solder, or braze, is composed exclusively of zirconium, nickel and titanium and/or at least one test hard solder, or braze, includes zirconium, nickel and titanium and at least one other component.

16. The method as claimed in claim 10, wherein:
a thermal expansion coefficient of the second active braze joint made with a starting hard solder, or braze, or a test hard solder, or braze, is determined, wherein said starting hard solder has the composition $Zr_{63}Ni_{22}Ti_{15}$, $Zr_{60}Ni_8Ti_2Cu_{20}Al_{10}$, $Zr_{54.5}Ni_8Ti_{7.5}Cu_{20}Al_{10}$, $Zr_{47}Ni_{35}Ti_{18}$, $Zr_{58}Ni_{23}Ti_9Cu_{10}$, $Zr_{52.5}Ni_{14.6}$, $Ti_5Cu_{17.9}Al_{10}$, $Zr_{43}Ni_{33}Ti_{24}$, or $Zr_{11}Ni_8Ti_{34}Cu_{47}$.

17. The method as claimed in claim 11, wherein the thermal expansion coefficient of the second active braze joint is determined based on a dependence of the capacitance of the capacitor on the height of the second active braze joint and a temperature dependence of the measured capacitances dependent on a temperature dependence of the electrode areas of the electrodes.

18. The method as claimed in claim 12, wherein the electrode expansion coefficient is determined based on capacitance measurements executed with a first apparatus and a second apparatus, wherein the first apparatus comprises:
said two measuring bodies
a heating apparatus, and
connected to said electrodes of said measuring bodies, a measurement circuit, which measures capacitance of the capacitor at at least two different temperatures of the second active braze joint,
and wherein the second apparatus differs from the first apparatus exclusively in that the diameters of the electrodes of the second apparatus differs from the diameters of the electrodes of the first apparatus.

19. The method as claimed in claim 15, wherein said at least one other component is copper or aluminum.

20. A method for manufacturing a pressure sensor, the pressure sensor comprising: two parts connected with one another via an active braze joint manufactured by active hard soldering, or brazing, with an active hard solder, or braze, wherein one of the two parts is a pressure contactable, pressure-dependently elastically deformable, measuring membrane, and the other one of the two parts is a base body, wherein the membrane and the base body are connected by an active braze joint connecting an outer edge of said measuring membrane with an outer edge of an end of said base body facing said measuring membrane, thereby creating a pressure chamber,
wherein the method comprises the steps of:
determining the active hard solder, or braze, for manufacturing the active braze joint of the pressure sensor, based on the dimensions of the active braze joint, such, that said active braze joint has a coefficient of thermal expansion dependent on the dimensions of said active braze joint and on the materials of said two parts and said coefficient of thermal expansion of said active braze joint is matched to a coefficient of thermal expansion of said measuring membrane,
wherein the matching is performed such that a difference between the coefficient of thermal expansion of said active braze joint and a coefficient of thermal expansion of said measuring membrane has an absolute value smaller than a difference between a coefficient of thermal expansion of said active hard solder, or braze, and the coefficient of thermal expansion of said measuring membrane,
and wherein the determination of the active hard solder, or braze, comprises the steps of:
performing at least one measurement; wherein a thermal expansion coefficient of a second active braze joint made with an active hard solder, or braze, is determined, wherein:
the dimensions of the second active braze joint equal the dimensions of the active braze joint of the pressure sensor; and
wherein two measuring bodies are connected with one another by the second active braze joint,
wherein:
the measuring bodies have electrodes on mutually facing ends and the electrodes form a capacitor having a capacitance dependent on their electrode separation dependent on a temperature dependent height of the second active braze joint;
and wherein said at least one measurement comprises the step of:
measuring the capacitance of the capacitor at at least two different temperatures of the second active braze joint and, based on a dependence of the capacitance on the height of the second active braze joint, the thermal expansion coefficient of the second active braze joint is determined.

* * * * *